UNITED STATES PATENT OFFICE.

CHESTER E. ANDREWS, OF PITTSBURGH, PENNSYLVANIA, ASSIGNOR TO THE SELDEN COMPANY, OF PITTSBURGH, PENNSYLVANIA, A CORPORATION OF DELAWARE.

PROCESS OF TREATING CYMENE.

1,314,920.  Specification of Letters Patent.  Patented Sept. 2, 1919.

No Drawing.   Application filed September 13, 1917.   Serial No. 191,245.

*To all whom it may concern:*

Be it known that I, CHESTER E. ANDREWS, a citizen of the United States, residing at Pittsburgh, in the county of Allegheny and State of Pennsylvania, have invented certain new and useful Improvements in Processes of Treating Cymene, of which the following is a specification.

The present invention relates to a process of treating cymene, and may be employed in the treatment of cymene in a pure condition, or may be applied to a crude cymene, and further involves the previous treatment of materials containing cymene for the removal of some of the other ingredients. The invention provides a process of nitrating cymene, that is to say producing nitro-cymene, and if desired the further treatment of the nitro-cymene by reduction, to form amino-cymene, which material is capable of use in the production of various derivatives suitable for use in the arts.

As a starting material, I preferably employ the so-called "spruce turpentine" which is a product already known, produced as a by-product from the relief liquor in the production of wood pulp, by boiling spruce wood chips in sulfite liquor. The oily material so obtained in the treatment of spruce wood has been found to contain very large amounts of cymene, although the relief liquor product from other kinds of woods also contains some of this material. The material is accordingly referred to under the term "spruce turpentine," which term does not of necessity mean that the material is exclusively obtained from spruce, nor that the material is actually turpentine.

An analysis of a typical sample of spruce turpentine showed this material to contain cymene, terpenes, water and $SO_2$ in solution, together with other materials which for the purpose of the present invention may be disregarded.

The operation of the process is as follows: The spruce turpentine is first treated with a quantity of quick lime, equivalent to a little more than the combined water and $SO_2$ content, in order to precipitate calcium sulfite and calcium hydrate, and to some extent calcium sulfate due to oxidation of $SO_2$ to $SO_3$, after which the liquor is stirred, settled and decanted or filtered or otherwise separated from the solid. The liquid remaining was found to contain approximately 75% of cymene and the remainder was mostly terpenes. The oil may be fractionally distilled and the fraction boiling at about 175° C. can be further treated as cymene, or the entire oily mixture may be subjected to the nitration process. The latter mode of operation is in most respects advisable, since the terpene material, and most of the other impurities present are found not to be materially altered during the nitration operation, and their presence in the material does not produce any unfavorable effects, and a purification at a later stage of the process is more simple and more complete.

The nitration process is preferably carried out as follows. The cymene or preferably the mixture of cymene and terpenes is dissolved in a solvent. Sulfuric acid of 98% strength can be used as the solvent, in the proportion of about 1 part of cymene by weight to 1 part of the acid by weight. In place of sulfuric acid, other anhydrous solvents which are not capable of deleteriously affecting the nitration may be employed, an example of such being glacial acetic acid, which material can be used in the proportions of about one and one-half parts of the acid to one part of cymene. This step is preferably carried out while the mixture is cold. A mixture of sulfuric acid of 98% strength and nitric acid of 70% strength, preferably in the proportions of about 2 parts of sulfuric to 1 of nitric is then added to the solution of cymene in sulfuric acid.

In the preferred form of operation, I dissolve 67 parts of the cymene (or preferably an amount of the purified spruce turpentine containing 67 parts of cymene) in 67 parts of sulfuric acid of about 98% strength. This mixture is then cooled to about 0° C. A mixture of 105 parts of 98% sulfuric acid and 50 parts of 70% nitric acid is then made, which mixture is then cooled to 0° C. The mixed acids are run into the mixture of cymene and sulfuric acid, while stirring and while maintaining the temperature throughout at about 0° C. It is necessary to prevent any extensive heating during the addition of the nitrating acid. The above amounts correspond to an excess of nitric acid of about 10%. The cymene is converted into mononitro-cymene, in a substantially complete manner, and as soon as all of the mixed acid has been added, the reaction is substantially complete, and the reaction mixture is then dumped into a large quantity of cold water, that is to say water at ordinary temperature. During this operation, however, the temperature need not be watched, since no harm is done if the mixture gets hot. The nitro compound is an oil which floats on the top of the diluted acid, and is separated therefrom by decantation, and is washed one or more times with a solution of alkali, say a 2 or 3% soultion of sodium carbonate, to remove free acid.

The oily mixture now contains as its principal ingredient 1-methyl-2-nitro-4-ispropyl-benzene.

The mono-nitro compound can be purified if desired, by fractional distillation in a high vacuum, say 28 inches or more. This however, is not necessary, and I prefer to allow the purification to wait until a subsequent stage.

The mono-nitro-cymene is now preferably reduced to mono-amino cymene, by any suitable process of vigorous reduction, for which purpose boiling the mixture with powdered iron and hydrochloric acid is suitable, or any strong acid-reducing agent may be employed, or if desired the reduction can be effected by treatment with hydrogen in the presence of a nickel or similar catalyst.

The mono-amino-cymene can be distilled, for example by the introduction of a current of superheated steam, to produce the relatively pure mono-amino-cymene, which latter may be employed for various purposes in the arts.

As a more complete mode of purification, the crude material containing the mono-amino-cymene is agitated with a considerable quantity of dilute sulfuric acid, to produce the sulfate of the amin, in aqueous solution. The sulfate is a solid and is not volatile with steam. The impurities present, largely terpenes, may be then removed from the solution by steam distillation, leaving an aqueous solution of the purified sulfate of the amin. Milk of lime or other alkali is then added to the aqueous solution, to decompose the sulfate and set free the mono-amino compound, which is an oil which is not soluble in water. The oil may be steam-distilled from the mixture in a relatively pure state.

Mono-amino-cymene is suitable for use in the production of various dyestuffs and other chemicals.

While I have described the process in great detail, I call attention to the fact that the invention is not limited to the details referred to, but variations in the process may be made, within the scope of the appended claims.

The strengths of acid and relative proportions are those found to give the best commercial results. It will be noted however, that the invention is not limited thereto.

What I claim is:

1. A process of treating a liquid material comprising cymene, terpenes, water and dissolved $SO_2$, which comprises first adding an amount of quick-lime at least substantially sufficient to combine with all of the water and $SO_2$, separating the precipitate from the liquid organic matter, dissolving the liquid organic material in sulfuric acid of about 98% strength, in the proportions of 67 parts of cymene to about 67 parts of sulfuric acid, cooling the mixture to about 0° C., adding to such cooled mixture, while agitating and while maintaining therein a temperature of about 0° C., a mixture of about 50 parts of $HNO_3$ of about 70% strength and about 105 parts of $H_2SO_4$ of about 98% strength; adding the reaction mass to a large mass of water within a short time after the entire amount of mixed acid has been added, and separating the oily material which contains mono-nitro-cymene, reducing the mono-nitro-cymene to mono-amino cymene, and purifying the latter.

2. A process of nitrating cymene, which comprises dissolving spruce turpentine material containing cymene and terpenes in an anhydrous solvent, adding to the solution a mixture of strong nitric and sulfuric acid while stirring and while maintaining the reaction mass at not materially above 0° C., until an amount of mixed acid has been added sufficient to nitrate substantially all of the cymene in the spruce turpentine.

3. A process of nitrating cymene, which comprises dissolving a mixture containing cymene and terpenes in strong sulfuric acid, adding to the solution a mixture of strong nitric and sulfuric acid while stirring and while maintaining the reaction mass at not materially above 0° C., until an amount of nitric acid corresponding to an excess of about 10% over the amount theoretically necessary to form mono nitro cymene has been added, whereby the cymene is nitrated and the other ingredients are substantially unaffected.

4. A process of producing nitro cymene material which comprises treating spruce turpentine with an alkali to neutralize impurities of an acid nature, removing the product of such reaction, and subjecting the partially purified product containing cymene and organic impurities to nitration, whereby the cymene is nitrated while the said organic impurities are substantially unaffected.

5. A process of nitrating cymene, which comprises dissolving a material containing terpenes and containing about 67 parts of cymene in about 67 parts of strong sulfuric acid, adding thereto a mixture of about 105 parts of strong sulfuric acid and about 50 parts of strong nitric acid, while maintaining the temperature of the reacting mixture at not above about 0° C., and while stirring the reacting mixture, whereby the cymene is nitrated and the other materials present are substantially unaffected.

6. A process of producing amino cymene which comprises nitrating the cymene in a crude material containing cymene and terpenes, then reducing the nitro body in the mixture to an amino body, and separating the amino cymene from the mixture.

7. A process of treating cymene material which comprises adding to spruce turpentine, an amount of quick-lime sufficient to unite with the water and free acid therein, nitrating the cymene material, and reducing the nitro cymene in such material to amino cymene, and thereafter removing terpene bodies therefrom.

8. Process of producing nitro-cymene which comprises adding to spruce turpentine, an amount of quick-lime at least equivalent to the water and free acids and acid anhydrids therein, separating the solid material from the liquid and treating the latter with a nitrating mixture.

9. In the production of cymene derivatives, the step of adding to spruce turpentine, an amount of quick-lime at least sufficient to unite with all the water and free acids and acid anhydrids therein, and after the reaction, separating the solids from the liquid.

10. A process of producing amino cymene in a relatively pure state from crude spruce turpentine which comprises adding to the spruce turpentine an amount of quick-lime at least sufficient to unite with all the water and free acid and acid anhydrid therein, separating the solids from the liquid, nitrating the cymene content of the liquid, then reducing the nitro cymene to amino cymene, and thereafter separating the amino cymene from the mixture.

11. A process of treating crude spruce turpentine which comprises adding lime, filtering and nitrating the filtrate.

In testimony whereof I affix my signature.

CHESTER E. ANDREWS.